US012196596B2

United States Patent
Healy et al.

(10) Patent No.: US 12,196,596 B2
(45) Date of Patent: Jan. 14, 2025

(54) NESTING MEASURING CUPS

(71) Applicant: Lovevery, Inc., Boise, ID (US)

(72) Inventors: John Patrick Healy, Boise, ID (US); Seth Thomas Murray, Piedmont, CA (US)

(73) Assignee: Lovevery, Inc., Boise, ID (US)

( * ) Notice: Subject to any disclaimer, the term of this patent is extended or adjusted under 35 U.S.C. 154(b) by 0 days.

(21) Appl. No.: 18/567,241

(22) PCT Filed: Jun. 10, 2022

(86) PCT No.: PCT/US2022/072878
§ 371 (c)(1),
(2) Date: Dec. 5, 2023

(87) PCT Pub. No.: WO2022/261670
PCT Pub. Date: Dec. 15, 2022

(65) Prior Publication Data
US 2024/0263985 A1    Aug. 8, 2024

Related U.S. Application Data

(60) Provisional application No. 63/209,798, filed on Jun. 11, 2021.

(51) Int. Cl.
*G01F 19/00* (2006.01)
*B65D 21/02* (2006.01)
*G09B 19/02* (2006.01)

(52) U.S. Cl.
CPC ....... *G01F 19/002* (2013.01); *B65D 21/0233* (2013.01); *G09B 19/02* (2013.01)

(58) Field of Classification Search
CPC .................................................... G01F 19/002
See application file for complete search history.

(56) References Cited

U.S. PATENT DOCUMENTS

| 1,848,066 A | 3/1932 | Shepard et al. |
| 2,611,193 A * | 9/1952 | Davis ............... G09B 19/02 434/196 |

(Continued)

FOREIGN PATENT DOCUMENTS

| CN | 101520337 | 9/2009 |
| CN | 101520337 A * | 9/2009 |

OTHER PUBLICATIONS

Translation CN101520337A (Year: 2009).*

(Continued)

*Primary Examiner* — Eugene L Kim
*Assistant Examiner* — Alyssa M Hylinski
(74) *Attorney, Agent, or Firm* — Fish & Richardson P.C.

(57) ABSTRACT

A set of nesting cups includes two or more cups, each cup including a respective rim having a flange, and a respective bowl depending from the rim. The respective bowl of each cup is formed by a curved side wall and one or two straight side walls extending from the respective rim of the cup to a closed bottom of the bowl. The curved side wall of each bowl has an upper edge at the rim of the cup, the upper edge forming a circle segment completed by a perimeter of the flange. The circle segments formed by the upper edges of the curved side walls of the cups define different included angles, and the bowls of the cups are sized to nest.

19 Claims, 10 Drawing Sheets

(56) References Cited

U.S. PATENT DOCUMENTS

| | | | |
|---|---|---|---|
| 2,896,809 A | | 7/1959 | Metzger et al. |
| 3,996,675 A | * | 12/1976 | Placek .................. G09B 23/02 |
| | | | 428/7 |
| D255,530 S | | 6/1980 | Daenen et al. |
| D259,460 S | * | 6/1981 | Daenen ....................... D10/46.3 |
| D351,316 S | | 10/1994 | Mann |
| D355,735 S | | 2/1995 | Shaffer et al. |
| 5,470,234 A | * | 11/1995 | Sher ........................ G09B 1/02 |
| | | | 434/214 |
| D437,793 S | * | 2/2001 | Kaposi ....................... D10/46.2 |
| 6,575,755 B2 | * | 6/2003 | Dreyfous ................ G09B 19/02 |
| | | | 434/207 |
| D577,615 S | | 9/2008 | Markfelder |
| D582,798 S | | 12/2008 | Mantilla et al. |
| 7,753,206 B2 | | 7/2010 | Sawhney et al. |
| D624,444 S | * | 9/2010 | Fenner ........................ D10/46.2 |
| D738,228 S | * | 9/2015 | Joshi ........................... D10/46.3 |
| D845,153 S | * | 4/2019 | Daniels ........................ D10/46.3 |
| D1,010,017 S | * | 1/2024 | Healy ........................... D21/483 |
| 2005/0247129 A1 | * | 11/2005 | Carragan ................ G01F 19/00 |
| | | | 73/426 |
| 2006/0277994 A1 | * | 12/2006 | Peterson ............... G01F 19/002 |
| | | | 73/426 |
| 2008/0136202 A1 | | 6/2008 | McRorie et al. |
| 2008/0276705 A1 | | 11/2008 | Yeung |
| 2008/0282797 A1 | * | 11/2008 | Saller ...................... G01F 19/00 |
| | | | 73/426 |
| 2011/0020772 A1 | | 1/2011 | Carter et al. |
| 2012/0198930 A1 | | 8/2012 | Hood et al. |
| 2017/0013980 A1 | | 1/2017 | Pickett |
| 2017/0081078 A1 | * | 3/2017 | Maple ................. A47J 43/0727 |

OTHER PUBLICATIONS

International Preliminary Report on Patentability in International Appln. No. PCT/US2022/072878, mailed on Dec. 11, 2023, 6 pages.
International Preliminary Report on Patentability in International Appln. No. PCT/US2022/072878, mailed on Mar. 6, 2024, 7 pages.
International Search Report and Written Opinion in International Appln. No. PCT/US2022/072878, mailed on Aug. 18, 2022, 9 pages.
Extended European Search Report in European Appln No. 22821266. 8, dated Nov. 13, 2024, 9 pages.
Sarang, "These measuring cups are designed to visually represent fractions for intuitive use!," Jul. 9, 2019, retrieved from URL<https://www.yankodesign.com/2019/07/09/these-measuring-cups-are-designed-to-visually-represent-fractions-for-intuitive-use>, 9 pages.

* cited by examiner

NESTING MEASURING CUPS

CROSS-REFERENCE TO RELATED APPLICATIONS

This application is a National Stage Application under 35 U.S.C. § 371 and claims the benefit of International Application No. PCT/US2022/072878, filed Jun. 10, 2022 which claims priority to U.S. Provisional Patent Application Ser. No. 63/209,798, filed Jun. 11, 2021. The entire contents of the foregoing are hereby incorporated by reference.

TECHNICAL FIELD

This invention relates to toys and more particularly to nesting measuring cup toys.

BACKGROUND

Children (e.g., infants and toddlers) can benefit from playing with sensory integration toys. Such toys can be designed to facilitate children to learn through the use of their senses and by doing so, children can improve focus and academic outcomes. Improvements in the design, configuration, and safety of such toys and their components are continually sought.

SUMMARY

In general, this disclosure relates to toys that include one or more measuring cups that are configured to be nested within each other.

In one aspect, the present disclosure features a set of nesting cups, each cup including a respective rim having a flange, and a respective bowl depending from the rim, wherein the respective bowl of each cup is formed by a curved side wall and one or two straight side walls extending from the respective rim of the cup to a closed bottom of the bowl, wherein the curved side wall of each bowl has an upper edge at the rim of the cup, the upper edge forming a circle segment completed by a perimeter of the flange, wherein the circle segments formed by the upper edges of the curved side walls of the cups define different included angles, and wherein the bowls of the cups are sized to nest, such that the set of nesting cups is configured to form a single stack of nested cups, with included angles decreasing from bottom to top of the stack.

In some embodiments, the set includes at least three cups.

In some embodiments, the set includes cups with bowls defining volumes of ¼ cup, ⅓ cup, and ½ cup.

In some embodiments, the flanges of each cup lie against each other when the set of nesting cups forms the single stack of nested cups.

In some embodiments, the bowl of one of the cups is formed by a curved side wall and only one straight side wall, such that the included angle defined by the circle segment formed by the upper edge of the curved side wall of said one of the cups is 180 degrees.

In some embodiments, the bowl of another of the cups is formed by a curved side wall and two straight side walls extending at right angles to one another, such that the included angle defined by the circle segment formed by the upper edge of the curved side wall of said another of the cups is 90 degrees.

In some embodiments, the set of cups includes a cup in which the included angle defined by the circle segment formed by the upper edge of the curved side wall is greater than 90 degrees and less than 180 degrees.

In some embodiments, the bowl of said another of the cups defines a cavity having a volume of 4 liquid ounces.

In some embodiments, the another of the cups is sized to nest within the cup having the included angle that is greater than 90 degrees and less than 180 degrees.

In some embodiments, the cup having the included angle that is greater than 90 degrees and less than 180 degrees is sized to nest within said one of the cups having an included angle that is 180 degrees.

In some embodiments, the bowl of said another of the cups defines a cavity having a volume that is: i) smaller than a volume of a cavity defined by the bowl of the cup having the included angle that is greater than 90 degrees and less than 180 degrees, and ii) smaller than a volume of a cavity defined by the bowl of the cups having the included angle of that is 180 degrees.

In some embodiments, the bowl of the cup having the included angle that is greater than 90 degrees and less than 180 degrees defines a cavity having a volume that is: i) smaller than a volume of a cavity defined by the bowl of the cup having the included angle that is 180 degrees, and ii) greater than a volume of a cavity defined by the bowl of the cup having the included angle that is 90 degrees.

In some embodiments, the set of nesting cups further includes an auxiliary cup having a circular rim and a circular bowl depending from the circular rim, wherein the set of nesting cups, when stacked, are sized to fit within the circular bowl of the auxiliary cup.

In some embodiments, the flange extends laterally from an upper edge of the one or two straight side walls.

In some embodiments, the flange and the rim together form a circular perimeter of each cup of the set of nesting cups.

In some embodiments, the upper edge of the curved side wall defines a constant radius.

In some embodiments, the flange extends laterally from the rim and is marked to indicate a volume of the cup.

In some embodiments, the circular bowl of the auxiliary cup defines a cavity having a volume of 8 liquid ounces.

In another aspect, the present disclosure features a set of nesting measuring cups, including: a first cup having a first rim defining a first opening into a first cavity defining a first volume, the first cavity bounded by a bottom surface and by a first side wall having a first curved portion and a straight portion, the first opening defined by an upper edge of the straight portion and an upper edge of the curved portion, the upper edge of the first curved portion defining a constant radius, the rim also forming a first flange that extends laterally from the upper edge of the straight portion, the first flange and first rim together forming a circular perimeter of the first cup; a second cup having a second rim defining a second opening into a second cavity defining a second volume smaller than the first volume, the second cavity bounded by a bottom surface of the second cup and by a second side wall having a second curved portion and two straight portions, the second opening defined by upper edges of the two straight portions and an upper edge of the second curved portion, the upper edge of the second curved portion defining a constant radius, the rim also forming a second flange that extends laterally from the upper edges of the two straight portions, the second flange and second rim together forming a circular perimeter of the second cup, wherein the two straight portions together define an included angle of less than 180 degrees, and wherein the second cup is sized to nest within the first cup with the second flange lying against the first flange; and a third cup having a third rim defining a third opening into a third cavity defining a third volume smaller than the second volume, the third cavity bounded by a bottom surface of the third cup and by a third side wall having a third curved portion and two straight portions, the third opening defined by upper edges of the two straight portions of the third side wall and an upper edge of the third curved portion, the upper edge of the third curved portion defining a constant radius, the rim also forming a third flange that extends laterally from the upper edges of the two straight portions of the third side wall, the third flange and third rim together forming a circular perimeter of the third cup, wherein the two straight portions of the third side wall together define an included angle of less than 180 degrees, and wherein the third cup is sized to nest within the second cup with the third flange lying against the second flange.

In some embodiments, the straight portions extend at an angle, with respect to a line perpendicular to the rim, of less than about 180 degrees.

In some embodiments, a closed bottom of the circular bowl of the auxiliary cup is marked to indicate the volume of the cup. In some embodiments, an interior surface of each respective bowl include a polymeric coating. In some embodiments, a marking on the closed bottom of the circular bowl of the auxiliary cup include a polymeric coating. In some embodiments, a marking on the flange of each cup include a polymeric coating.

Embodiments may provide one or more of the following advantages.

Various embodiments of the present disclosure relate to sets of nesting cups preferably intended for use by children (e.g., toddlers and/or infants of age three and under). In some embodiments, one of the functions of the set of nesting cups is to teach proportional relationships to the child. Having each cup sized to be a respective segment of a similar cylindrical volume, with all of them being of similar depth, shows the user tactilely and visually how the size of each cup relates to the whole (represented by the bottom cup). And providing each cup with a full circle rim shows, even when the cup is handled apart from the others, the proportion of the fractional representation of the cup volume to the whole.

Sensory integration is defined as a neurobiological activity within our bodies in which the nervous system processes information from the senses and organizes stimuli. In early childhood, sensory integration plays an important role in helping the child understand her/his immediate environment. In some embodiments, by providing visual and tactile information about the sizes of the cups, the set of nesting cups can facilitate the understanding of proportional relationships while using sensory integration.

In some embodiments, the sets of nesting cups include two or more cups having different volumes that can enhance the child's fine motor and size discrimination abilities. In some embodiments, the sets of nesting cups can further facilitate the development of self-help skills, which can include problem-solving skills and independence-building skills. When in use, in some embodiments, the sets of nesting cups of the disclosure can help teach children to do things for themselves at a young age, which can enable them to use problem solving skills and critical thinking skills.

The sets of nesting cups can include markings on the flange and/or on an internal surface of the bowls. These markings can indicate a volume of the cups. For example, in some embodiments, the markings include a numerical representation (e.g., a fraction) or one or more lines indicating a proportional relationship of the volume with respect to the whole. In some embodiments, by providing markings corresponding to the sizes of the cups, the set of nesting cups can facilitate the understanding of mathematical relationships.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
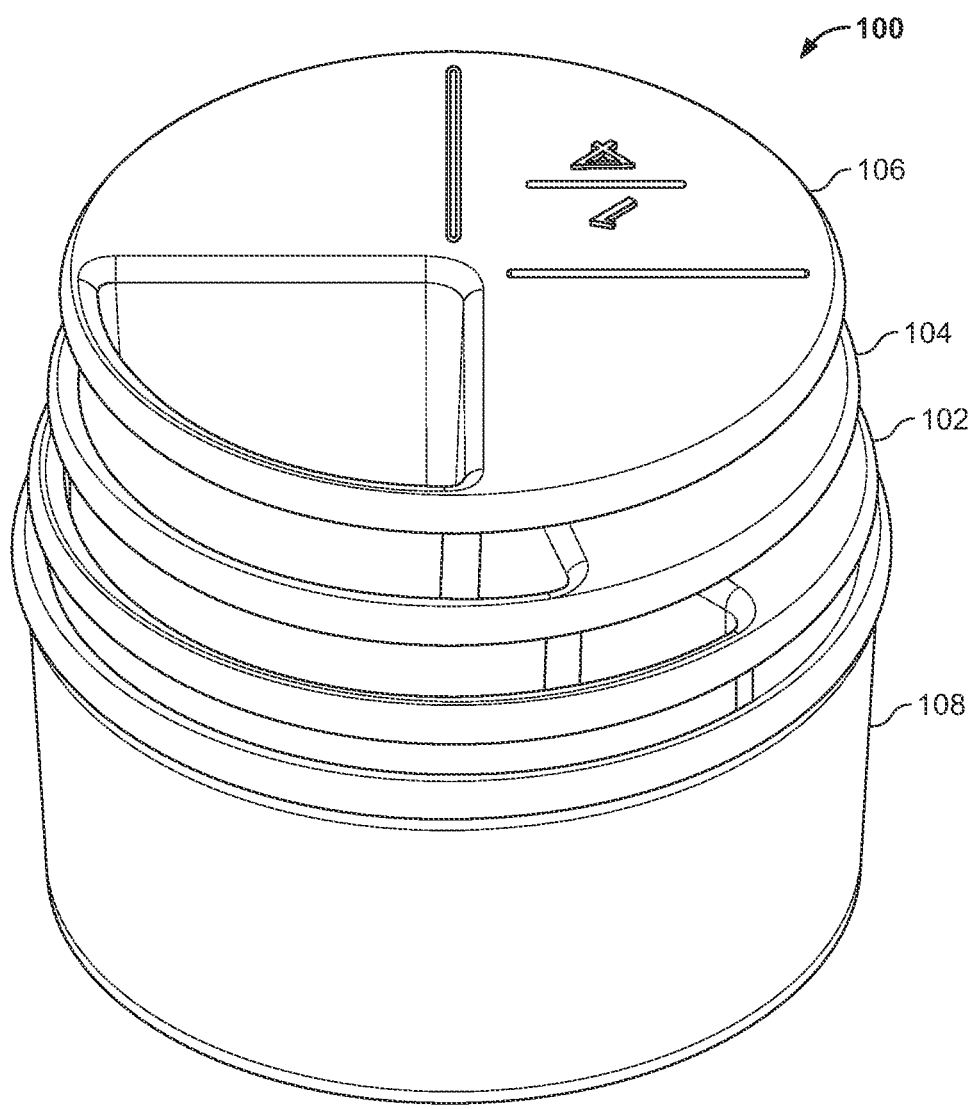
FIG. 1 is a perspective view of a set of nesting cups in a stacked or nested configuration.

FIG. 1 illustrates a set of nesting cups 100, in a nested or stacked configuration, that can be used by a child for play and/or educational purposes. The set of nesting cups 100 includes at least three cups. The set of nesting cups 100 includes cups with bowls defining volumes of ¼ cup, ⅓ cup, and ½ cup. In addition, the set of nesting cups 100 includes a cup with a bowl defining a volume of 1 cup. For example, the set of nesting cups 100 includes a first cup 102, a second cup 104, a third cup 106, and an auxiliary cup 108. The set of nesting cups 100 is typically made of one or more rigid materials that can withstand foreseeable use and/or damage by children. Example materials from which the set of nesting cups 100 may be made include plastic or wood. If made of plastic, the various individual cups of the set of nesting cups 100 may be separately molded.

Figure 2:
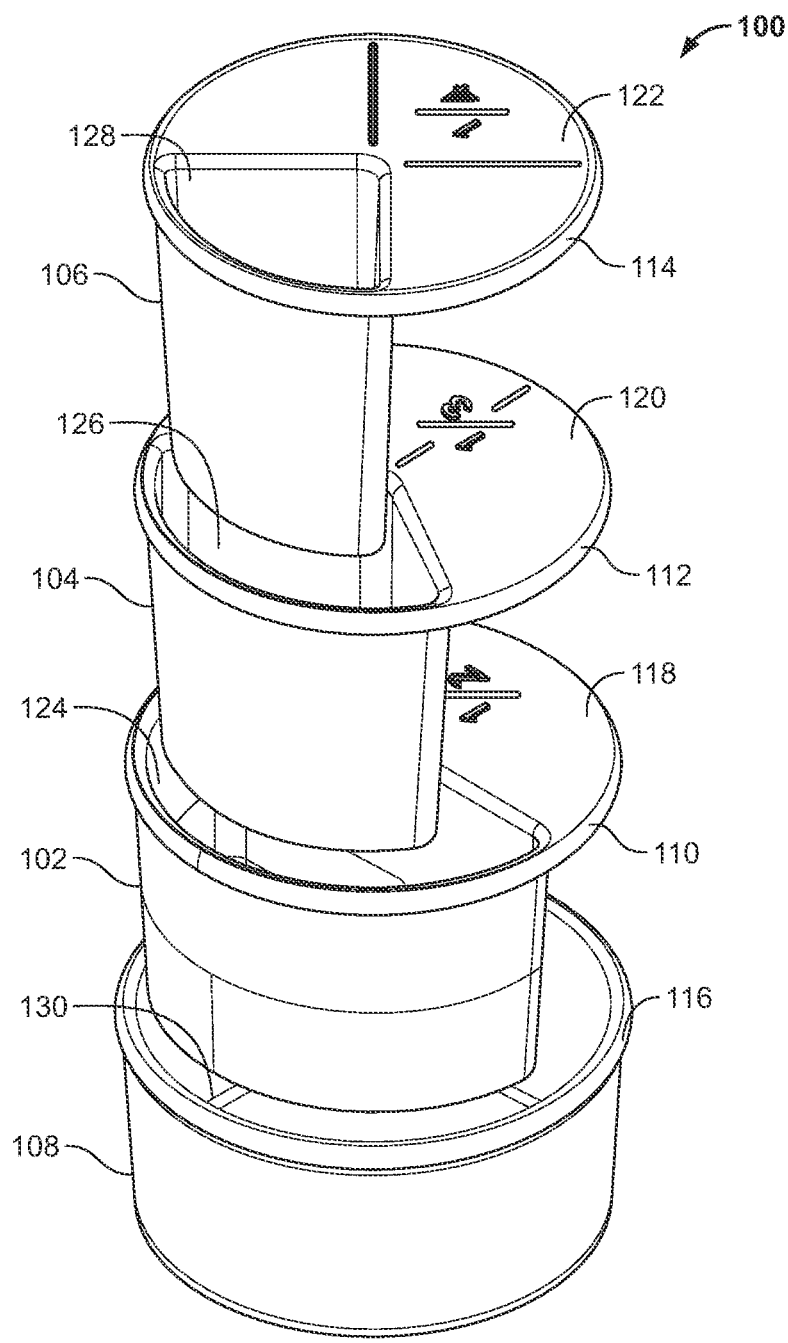
FIG. 2 is an exploded view of the set of nesting cups of FIG. 1.

FIG. 2 shows an exploded view of the set of nesting cups 100 in a separated configuration (i.e., not nested or stacked). Each cup includes a respective rim and a respective bowl depending from the rim. For example, the first cup 102 includes a first rim 110, the second cup 104 includes a second rim 112, the third cup includes a third rim 114, and the auxiliary cup 108 includes a circular rim 116. The first, second, and third rims 110, 112, 114 have a first flange 118, a second flange 120, and a third flange 122, respectively. The first, second, and third flanges 118, 120, 122 of each cup lie against each other when the set of nesting cups forms the single stack of nested cups, as shown in FIG. 1. The first cup 102 has a first bowl 124 depending from the first rim 110. The second cup 104 has a second bowl 126 depending from the second rim 112. The third cup 106 has a third bowl 128 depending from the third rim 114.

The first, second, and third bowls 124, 126, 128 of each cup are formed by a curved side wall and one or two straight side walls extending from the first, second, and third rims 110, 112, 114 of the cups to a closed bottom of the first, second, and third bowls 124, 126, 128. The curved side wall of each bowl has an upper edge at the rim of the cup. The upper edge forms a circle segment that is completed by a perimeter of the first, second, or third flange 118, 120, 122. The circle segments that are formed by the upper edges of the curved side walls of the cups define different included angles that vary based on the volume of each cup. The first, second, and third bowls 124, 126, 128 of each cup are sized to nest within each other, such that the set of nesting cups is configured to form a single stack of nested cups (as shown in FIG. 1), with included angles decreasing from bottom to top of the stack (e.g., from the first cup 102 to the third cup 106).

Figure 3:
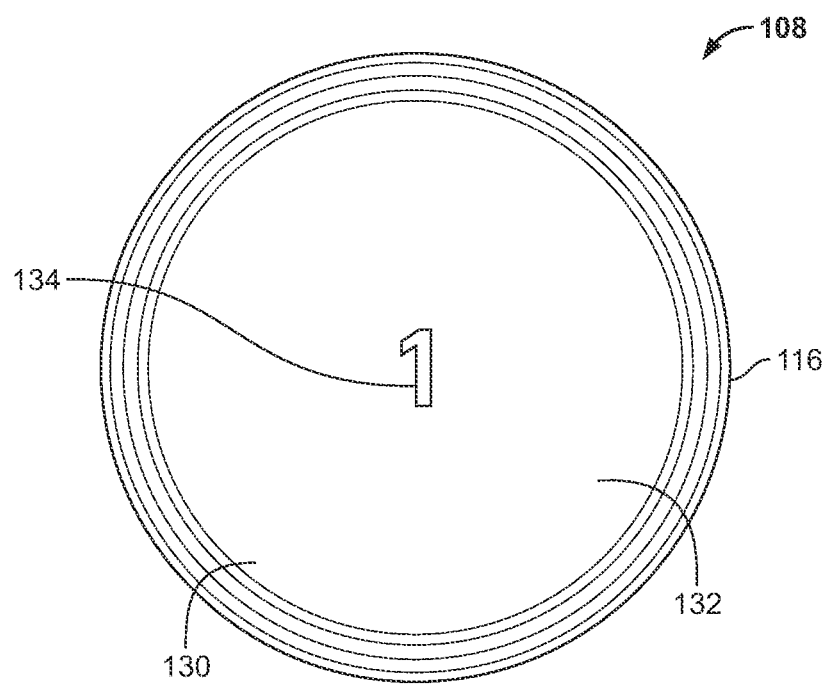
FIG. 3 is a top view of a cup of the nesting cups of FIG. 1.
Figure 4:
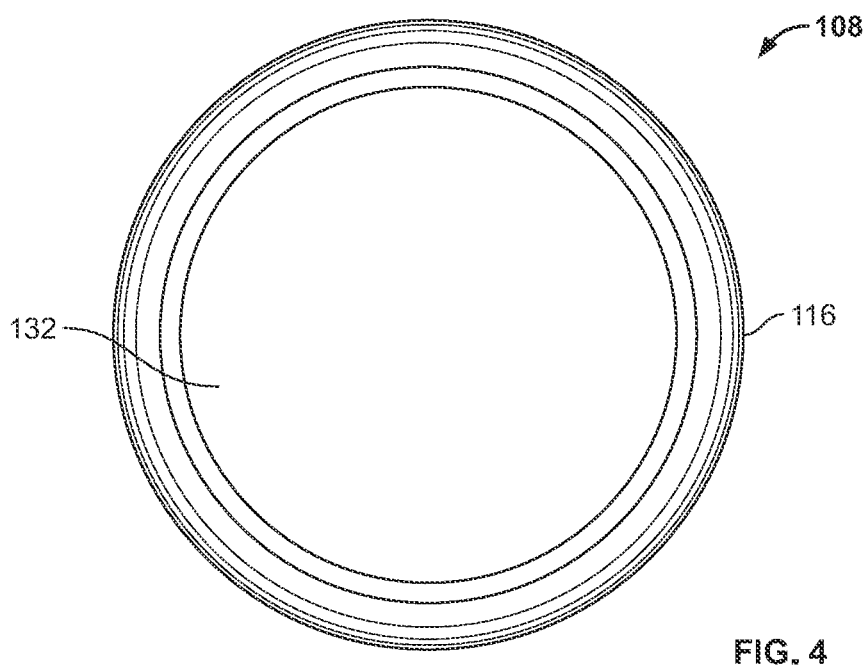
FIG. 4 is a bottom view of the cup of FIG. 3.
Figure 5:
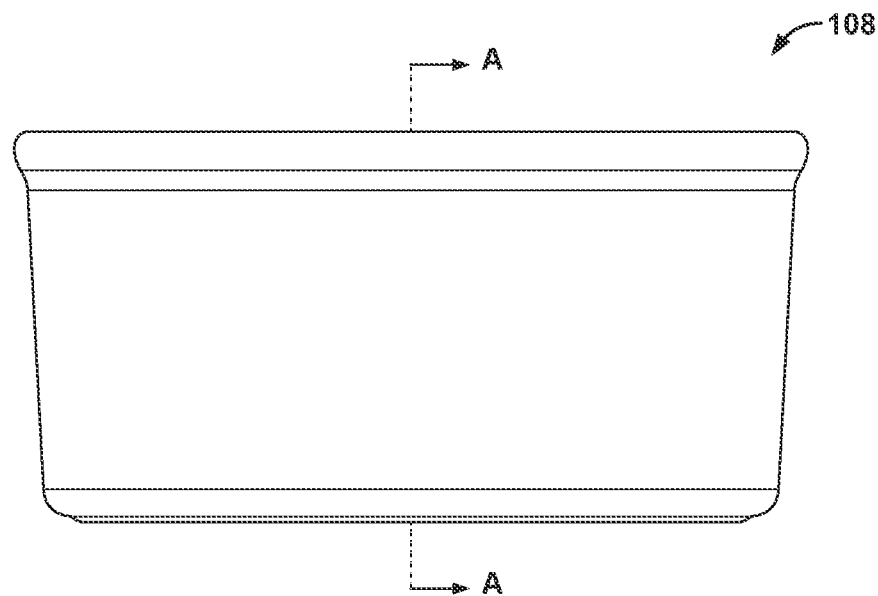
FIG. 5 is a side view of the cup of FIG. 3.
Figure 6:
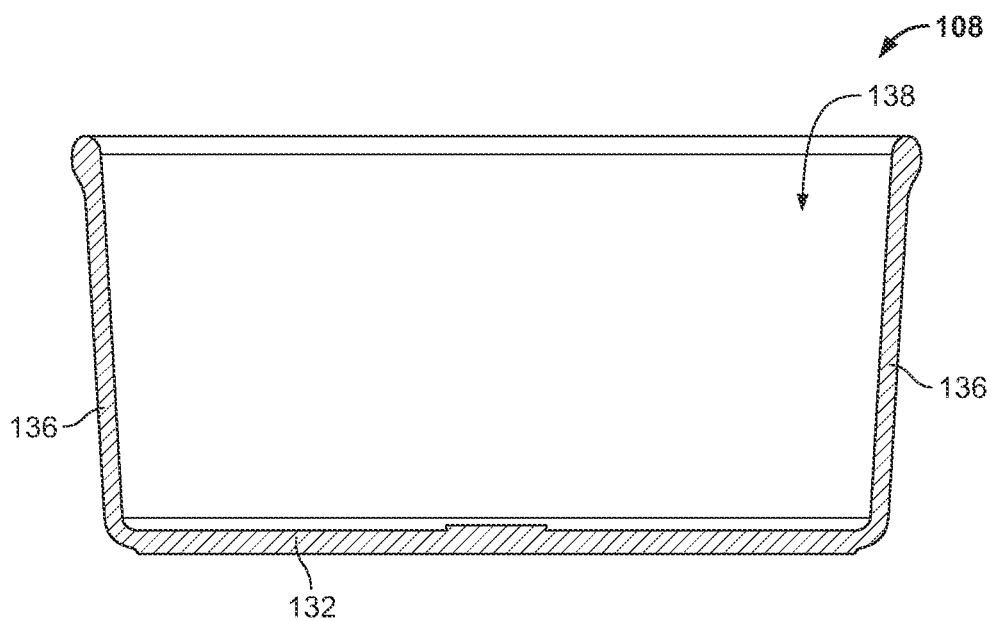
FIG. 6 is a side cross-sectional view of the cup taken along the line A-A of FIG. 5.
Figure 7:
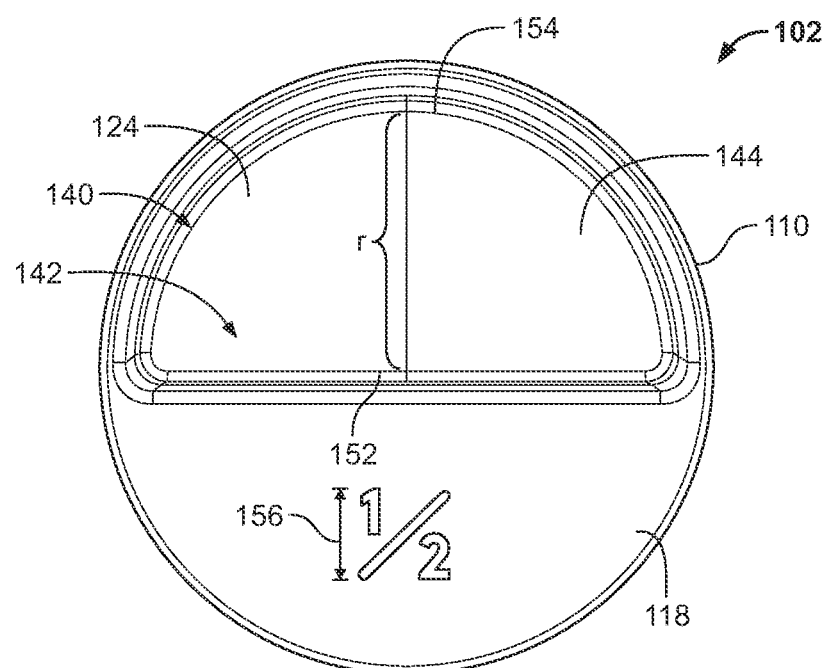
FIG. 7 is a top view of another cup of the set nesting cups of FIG. 1.
Figure 8:
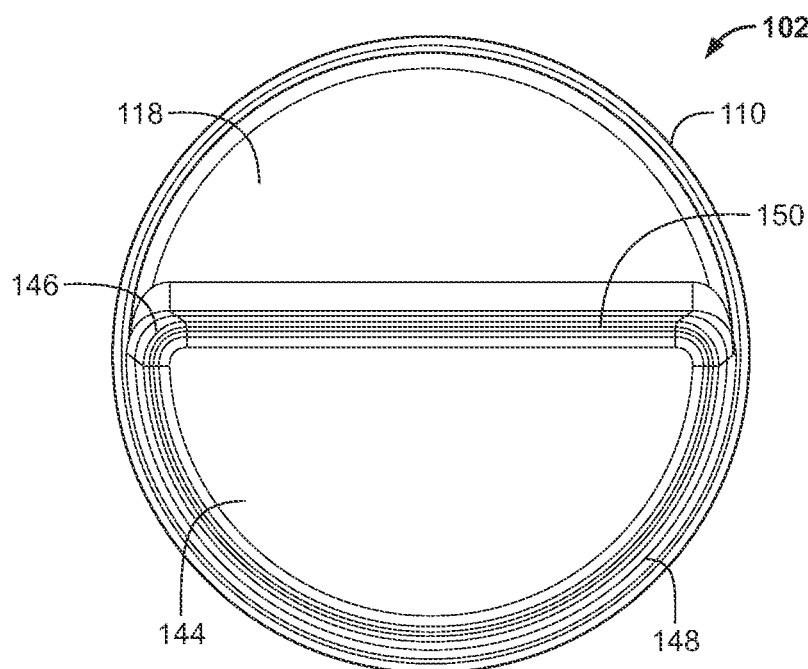
FIG. 8 is a bottom view of the cup of FIG. 7.
Figure 9:
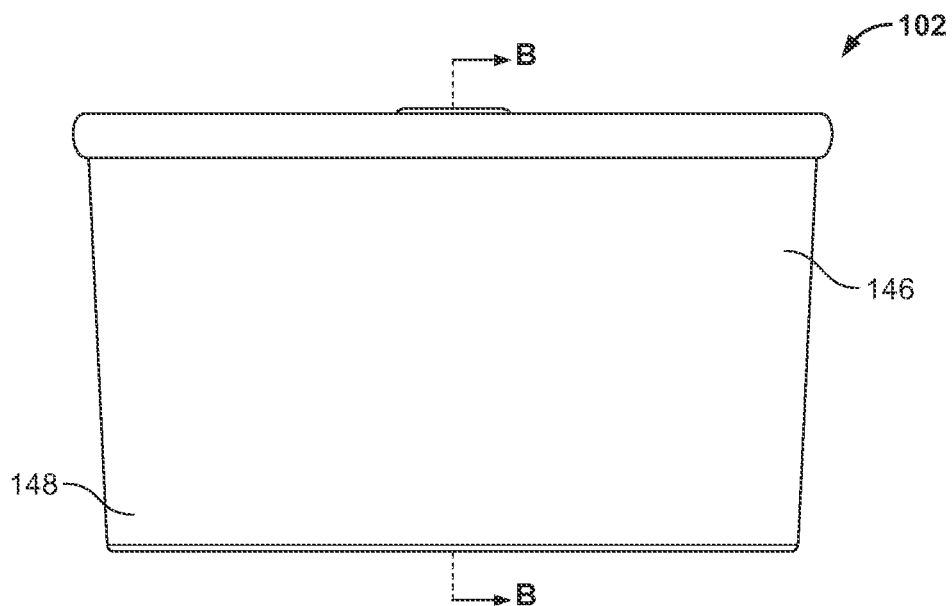
FIG. 9 is a side view of the cup of FIG. 7.
Figure 10:
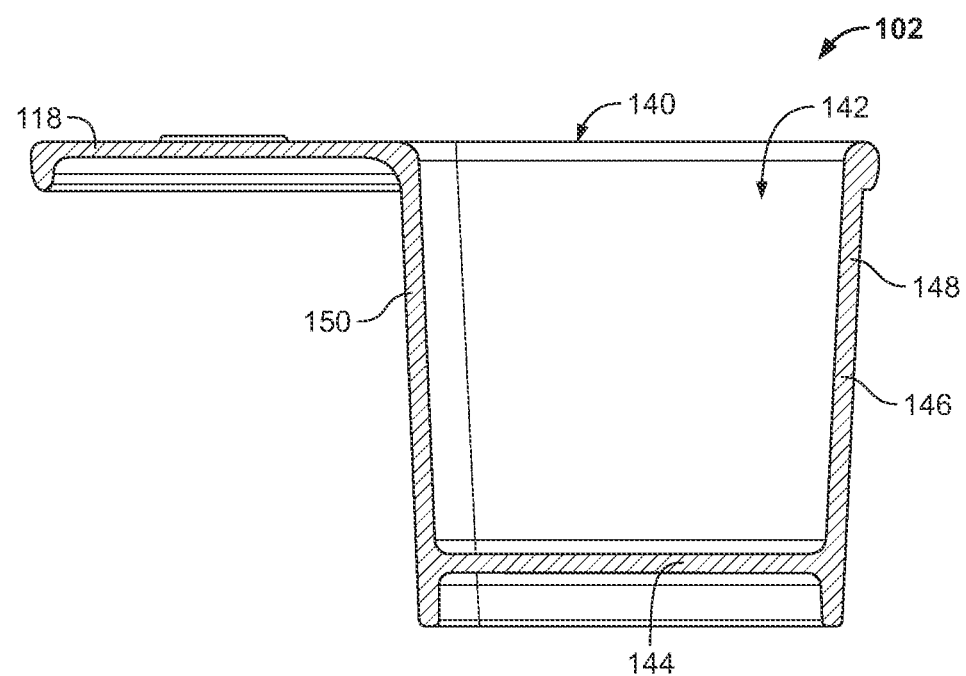
FIG. 10 is a side cross-sectional view of the cup taken along the line B-B of FIG. 9.
Figure 11:
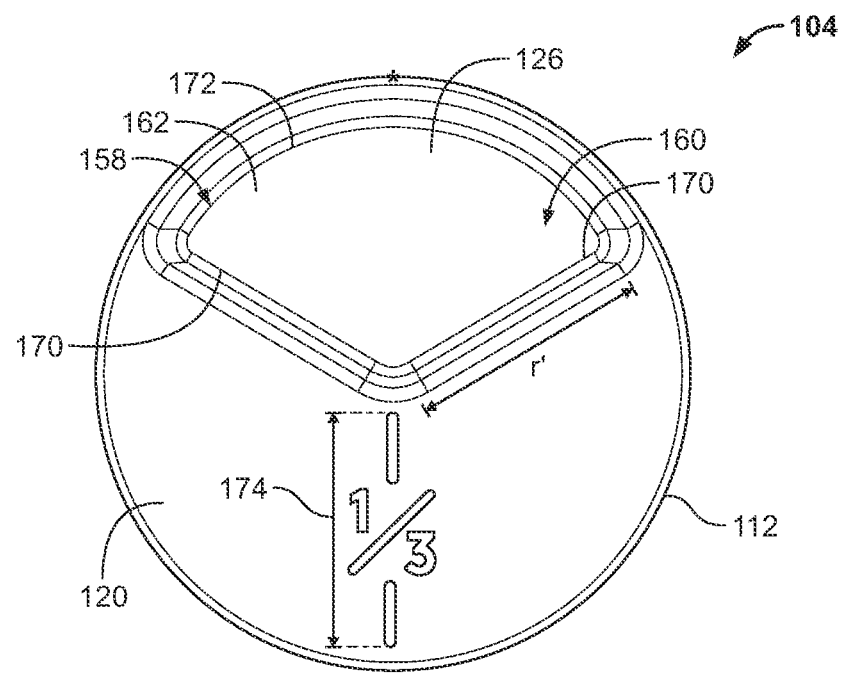
FIG. 11 is a top view of another cup of the set nesting cups of FIG. 1.

FIGS. 3, 4, 5, and 6 illustrate different views of the auxiliary cup 108. FIGS. 3 and 4 show a top and bottom view, respectively, of the auxiliary cup 108. The auxiliary cup 108 has a circular rim 116 and a circular bowl 130 depending from the circular rim 116. The circular bowl 130 has a closed bottom 132. The set of nesting cups, when stacked, are sized to fit within the circular bowl 130 of the auxiliary cup 108. The circular bowl 130 of the auxiliary cup 108 defines a cavity 138 having a volume of about 8 liquid ounces. The internal surface of the closed bottom 132 of the circular bowl 130 includes a marking 134 to indicate the volume of the auxiliary cup 108 (e.g., about 1 cup). The internal surface of the circular bowl 130 and the marking 134 include a polymeric coating (e.g., a glossy coating) to help accentuate the volume of the auxiliary cup 108 for the user. The marking 134 is typically marked via one or more manufacturing techniques, such as etching, engraving, ink marking, or the like. FIGS. 5 and 6 show a side view and a side cross-sectional view, respectively, of the auxiliary cup 108. The side cross-sectional view of FIG. 6 is taken along the line A-A of FIG. 5. The circular bowl 130 is formed by a circular wall 136.

Referring to FIGS. 7, 8, 9, and 10, the first rim 110 of the first cup 102 defines a first opening 140 into a first cavity 142 that further defines a first volume. The first volume is about 4 liquid ounces or ½ cup. The first cavity 142 is bounded by a bottom surface 144 and by a first side wall 146 having a first curved portion 148 and a first straight portion 150. The first bowl 124 is formed by first curved portion 148 and the first straight portion 150 that extend from the first rim 110 to the bottom surface 144 of the first bowl 124. The first bowl 124 is sized to be nested within the circular bowl 130 of the auxiliary cup 108. The first opening 140 is defined by an upper edge 152 of the first straight portion 150 and an upper edge 152 of the first curved portion 148. The upper edge 152 of the first curved portion 148 defines a constant radius r. The first rim 110 also forms the first flange 118 that extends laterally from the upper edge 152 of the first straight portion 150. The first flange 118 and first rim 110 together form a circular perimeter of the first cup 102. The circular perimeter of the first cup 102 is less than the circular perimeter of the auxiliary cup 108.

A surface of the first flange 118 includes a marking 156 to indicate the volume of the first cup 102 (e.g., about ½ cup). The internal surface of the first bowl 124 and the marking 156 include a polymeric coating (e.g., a glossy coating) to help accentuate the volume of the first cup 102 for the user. The marking 156 is typically marked via one or more manufacturing techniques, such as etching, engraving, ink marking, or the like.

Figure 12:
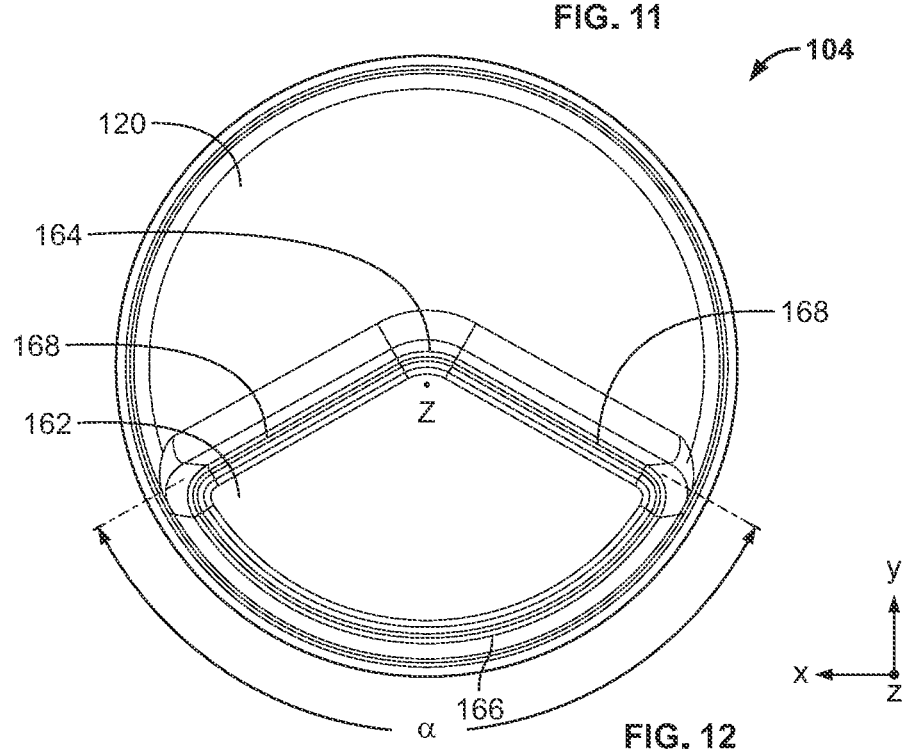
FIG. 12 is a bottom view of the cup of FIG. 11.
Figure 13:
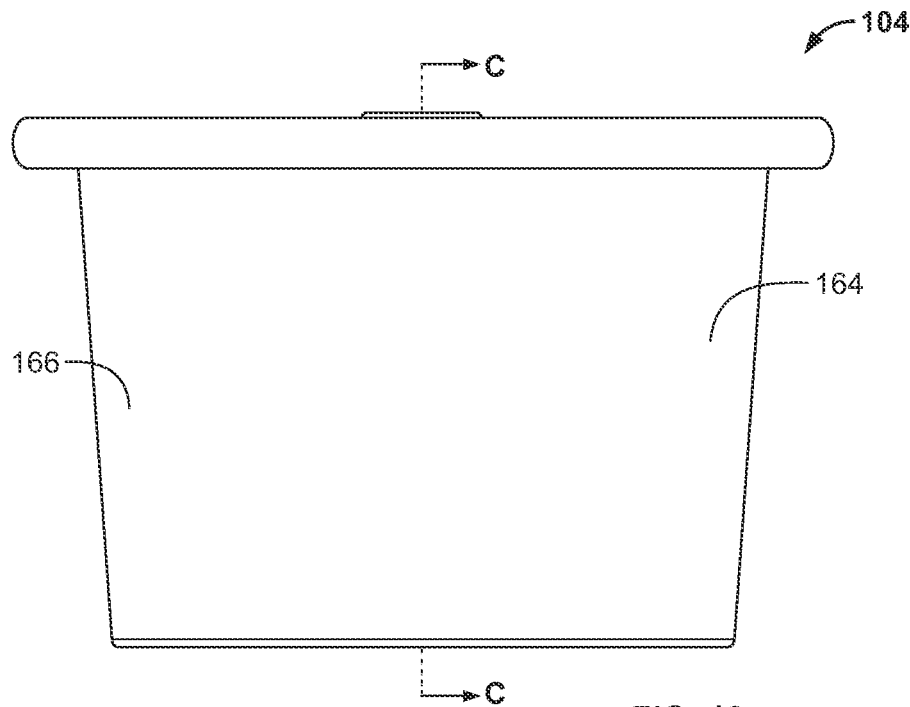
FIG. 13 is a side view of the cup of FIG. 11.
Figure 14:
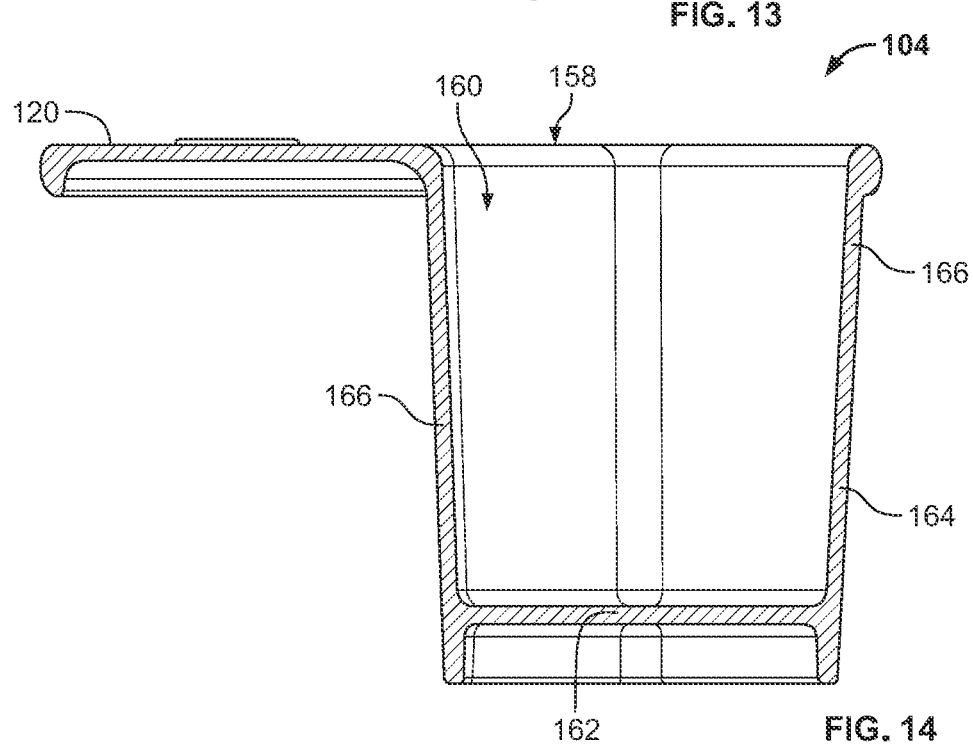
FIG. 14 is a side cross-sectional view of the cup taken along the line C-C of FIG. 13.
Figure 15:
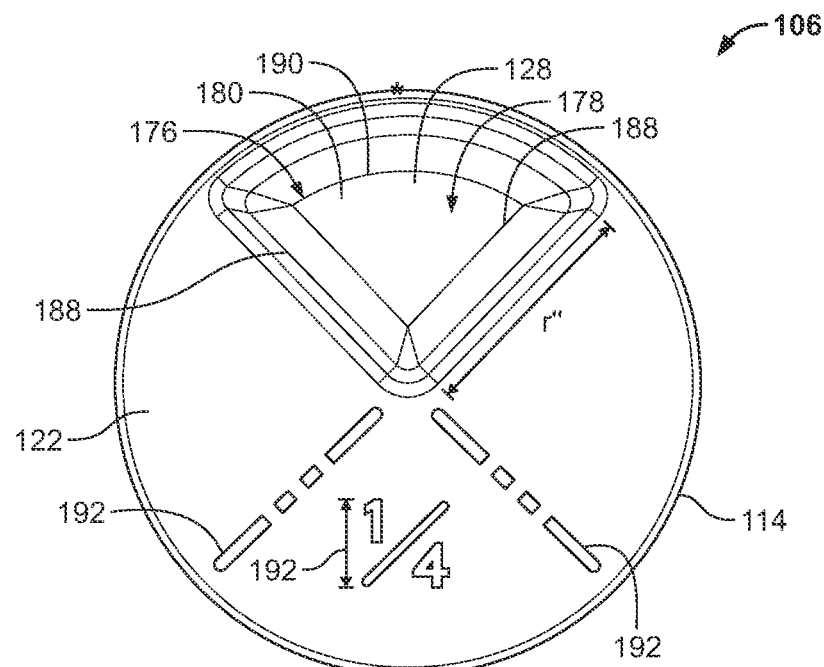
FIG. 15 is a top view of another cup of the set nesting cups of FIG. 1.

Referring to FIGS. 11, 12, 13 and 14, the second rim 112 of the second cup 104 defines a second opening 158 into a second cavity 160 that further defines a second volume. The second volume of the second cavity 160 is smaller than the first volume of the first cavity 142. For example, the second volume is about 0.33 liquid ounces or about ⅓ cup. The second cavity 160 is bounded by a bottom surface 162 and by a second side wall 164 having a second curved portion 166 and two second straight portions 168. The second bowl 126 is thus formed by the second curved portion 166 and the two second straight portions 168 that extend from the second rim 112 to the bottom surface 162 of the second bowl 126. The second bowl 126 is sized to be nested within the first bowl 124 of the first cup 102. The second opening 158 is defined by the upper edges 170 of the two second straight portions 168 and an upper edge 172 of the second curved portion 166. The upper edge 172 of the second curved portion 166 defines a constant radius r'. The second rim 112 also forms the second flange 120 that extends laterally from the upper edges 170 of the two second straight portions 168. The second flange 120 and second rim 112 together form a circular perimeter of the second cup 104. The two second straight portions 168 together define an included angle alpha ($\alpha$) of less than about 180 degrees. In some embodiments, the included angle alpha is greater than 90 degrees and less than 180 degrees. The second straight portions 168 extend at the angle alpha with respect to a line z that is perpendicular to the second rim 112, of less than about 180 degrees. FIG. 12 shows an x-y-z axis, in which the z-axis (i.e., line z) is pointing out of the page, and the x-axis and y-axis define a horizontal plane along the surface of the page. The circular perimeter of the second cup 104 is less than the circular perimeters of the auxiliary cup 108 and first cup 102. The second cup 104 is sized to nest within the first cup 102 with the second flange 120 lying against the first flange 118.

A surface of the second flange 120 includes a marking 174 to indicate the volume of the second cup 104 (e.g., about ⅓ cup). The internal surface of the second bowl 126 and the marking 174 include a polymeric coating (e.g., a glossy coating) to help accentuate the volume of the second cup 104 for the user. The marking 174 is typically marked via one or more manufacturing techniques, such as etching, engraving, ink marking, or the like.

Figure 16:
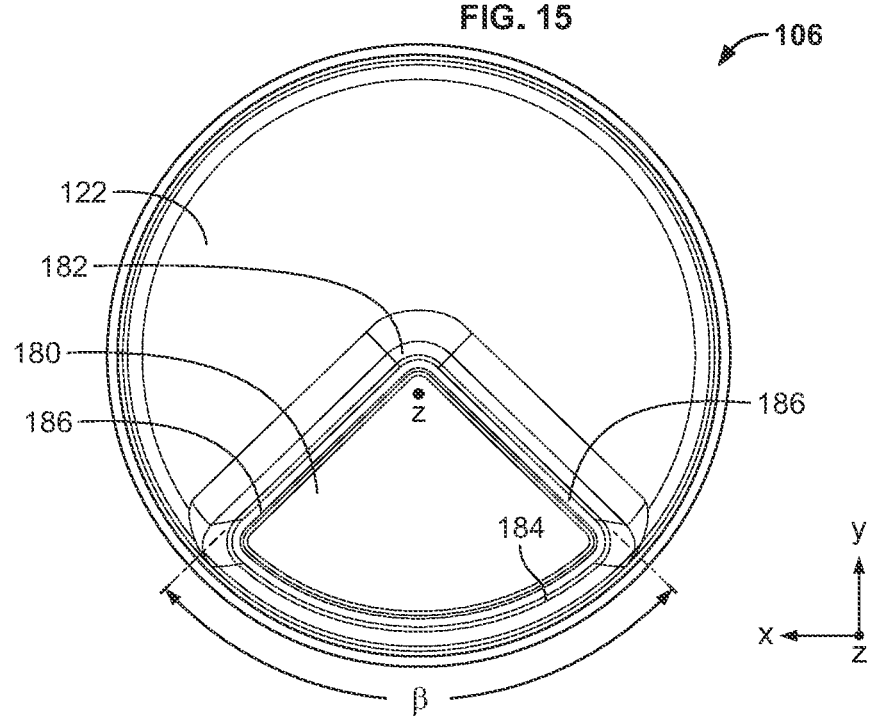
FIG. 16 is a bottom view of the cup of FIG. 15.
Figure 17:
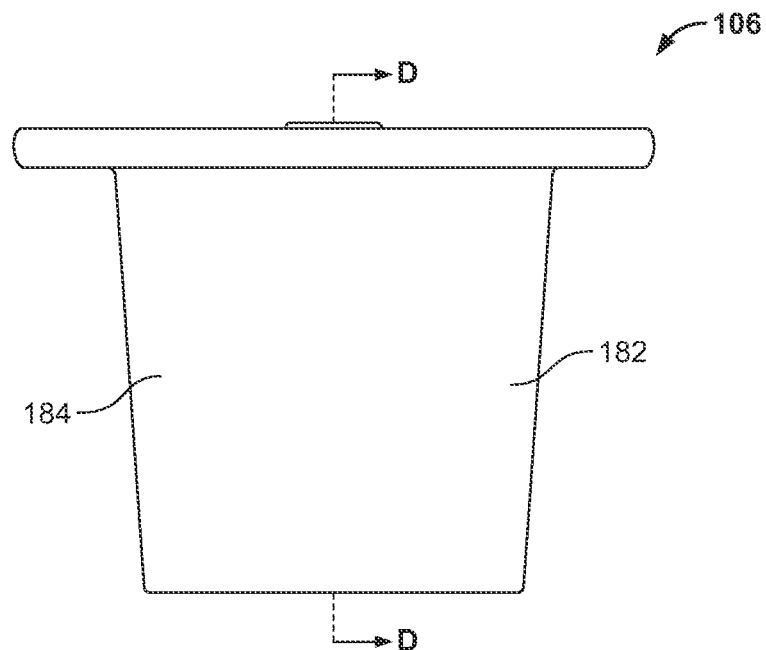
FIG. 17 is a side view of the cup of FIG. 15.
Figure 18:
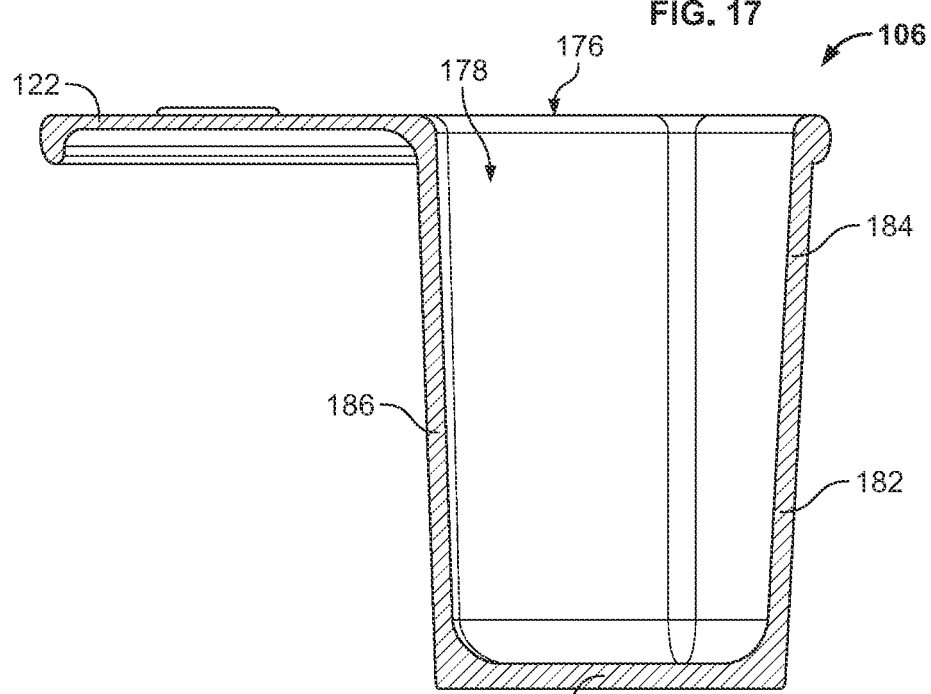
FIG. 18 is a side cross-sectional view of the cup taken along the line D-D of FIG. 17.

Referring to FIGS. 15, 16, 17, and 18, the circular rim 116 of the third cup 106 defines a third opening 176 into a third cavity 178 that further defines a third volume. The third volume of the third cavity 178 is smaller than the second volume of the second cavity 160. For example, the third volume is about 0.25 liquid ounces or about ¼ cup. The third cavity 178 is bounded by a bottom surface 180 and by a third side wall 182 having a third curved portion 184 and a pair of third straight portions 186. The third bowl 128 is thus formed by the third curved portion 184 and the pair of third straight portions 186 that extend from the third rim 114 to the bottom surface 180 of the third bowl 128. The third bowl 128 is sized to be nested within the second bowl 126 of the second cup 104. The third opening 176 is defined by the upper edges 188 of the pair of third straight portions 186 and an upper edge 190 of the third curved portion 184. The upper edge 190 of the third curved portion 184 defines a constant radius r". The third rim 114 also forms the third flange 122 that extends laterally from the upper edges 188 of the pair of third straight portions 186. The third flange 122 and third rim 114 together form a circular perimeter of the third cup 106. The pair of third straight portions 186 together define an included angle beta (β) of less than about 180 degrees. In some embodiments, the included angle beta is about 90 degrees. The third straight portions 186 extend at the angle beta with respect to a line z that is perpendicular to the second rim 114, of less than about 180 degrees. The pair of third straight portions 186 extend at right angles to one another such that the included angle beta is defined by the circle segment formed by the upper edge 190 of the curved portion 184 of the third cup 106 is about 90 degrees. The third cup 106 is sized to nest within the cup having an included angle that is greater than 90 degrees and less than 180 degrees. FIG. 16 shows an x-y-z axis, in which the z-axis (i.e., line z) is pointing out of the page, and the x-axis and y-axis define a horizontal plane along the surface of the page. The circular perimeter of the third cup 106 is less than the circular perimeters of the auxiliary cup 108, first cup 102, and the second cup 104. The third cup 106 is sized to nest within the second cup 104 with the third flange 122 lying against the second flange 120.

A surface of the second flange 120 includes a marking 174 to indicate the volume of the second cup 104 (e.g., about ⅓ cup). The internal surface of the second bowl 126 and the marking 174 include a polymeric coating (e.g., a glossy coating) to help accentuate the volume of the second cup 104 for the user. The marking 174 is typically marked via one or more manufacturing techniques, such as etching, engraving, ink marking, or the like.

Because the upper surface of each cup forms a full circle, either as a circular rim in the case of the auxiliary cup 108, or as the flange edge and rim segments of the other cups, the immediate appearance of each cup, from the top (i.e., FIGS. 3, 7, 11, and 15) helps the child to visualize the respective proportions of the volumes of each cup, as represented by their respective opening included angles. The complementary flanges of first, second, and third cups 102, 104, 106 are also helpful for grasping by young children still developing hand-eye coordination. As the child grows, the cups can be used more functionally as tools in advanced play, for measurement.

While the above-discussed set of measuring cups 100 has been described and illustrated as with respect to certain dimensions, shapes, arrangements, configurations, and material formulations, and with respect to certain methods, in some embodiments, a set of measuring cups that is otherwise substantially similar in construction and function to the set of measuring cups, or to any of the above-discussed individual measuring cups, may include one or more dimensions, shapes, arrangements, configurations, and/or materials formulations that are different from the ones discussed above or may be used with respect to methods that are modified as compared to the methods described above. For example, while the set of measuring cups 100 has been described and illustrated as including a first cup 102, a second cup 104, and a third cup 106, in some embodiments, a set of measuring cups that is otherwise substantially similar in construction and function to the set of nesting cups 100 may alternatively include one or more measuring cups (e.g., 3, 4, 5, 6, or more measuring cups).

For example, in some embodiments, the set of measuring cups that is otherwise substantially similar in construction and function to the set of nesting cups 100 may alternatively include one or more additional cups, each defining a volume of about ⅔ cup, ¾ cup, ⅛ cup, ⅜ cup, or the like.

While a number of examples have been described for illustration purposes, the foregoing description is not intended to limit the scope of the invention, which is defined by the scope of the appended claims. There are and will be other examples and modifications within the scope of the following claims.

What is claimed is:

1. A set of nesting cups, each cup comprising a respective rim having a flange, and a respective bowl depending from the rim,
   wherein the respective bowl of each cup is formed by a curved side wall and one or two straight side walls extending from the respective rim of the cup to a closed bottom of the bowl,
   wherein the curved side wall of each bowl has an upper edge at the rim of the cup, the upper edge forming a segment of a circle completed by a perimeter of the flange,
   wherein the segments of the circle formed by the upper edges of the curved side walls of the cups define different included angles,
   wherein the bowls of the cups are sized to nest, such that the set of nesting cups is configured to form a single stack of nested cups, with included angles decreasing from bottom to top of the stack; and
   wherein the flange and the upper edge of the rim together form a circular perimeter of the circle of each cup of the set of nesting cups.

2. The set of nesting cups of claim 1, wherein the set comprises at least three cups.

3. The set of nesting cups of claim 2, wherein the set includes cups with bowls defining volumes of ¼ cup, ⅓ cup, and ½ cup.

4. The set of nesting cups of claim 1, wherein the flanges of each cup lie against each other when the set of nesting cups forms the single stack of nested cups.

5. The set of nesting cups of claim 1, wherein the bowl of one of the cups is formed by a curved side wall and only one straight side wall, such that the included angle defined by the segment of the circle formed by the upper edge of the curved side wall of said one of the cups is 180 degrees.

6. The set of nesting cups of claim 5, wherein the bowl of another of the cups is formed by a curved side wall and two straight side walls extending at right angles to one another, such that the included angle defined by the segment of the circle formed by the upper edge of the curved side wall of said another of the cups is 90 degrees.

7. The set of nesting cups of claim 6, wherein the set of cups includes a cup in which the included angle defined by the segment of the circle formed by the upper edge of the curved side wall is greater than 90 degrees and less than 180 degrees.

8. The set of nesting cups of claim 6, wherein the bowl of said another of the cups defines a cavity having a volume of 4 liquid ounces.

9. The set of nesting cups of claim 6, wherein said another of the cups is sized to nest within the cup having the included angle that is greater than 90 degrees and less than 180 degrees.

10. The set of nesting cups of claim 7, wherein the cup having the included angle that is greater than 90 degrees and less than 180 degrees is sized to nest within said one of the cups having an included angle that is 180 degrees.

11. The set of nesting cups of claim 7, wherein the bowl of said another of the cups defines a cavity having a volume that is: i) smaller than a volume of a cavity defined by the bowl of the cup having the included angle that is greater than 90 degrees and less than 180 degrees, and ii) smaller than a volume of a cavity defined by the bowl of the cups having the included angle of that is 180 degrees.

12. The set of nesting cups of claim 7, wherein the bowl of the cup having the included angle that is greater than 90 degrees and less than 180 degrees defines a cavity having a volume that is: i) smaller than a volume of a cavity defined by the bowl of the cup having the included angle that is 180 degrees, and ii) greater than a volume of a cavity defined by the bowl of the cup having the included angle that is 90 degrees.

13. The set of nesting cups of claim 1, further comprising an auxiliary cup having a circular rim and a circular bowl depending from the circular rim, wherein the set of nesting cups, when stacked, are sized to fit within the circular bowl of the auxiliary cup.

14. The set of nesting cups of claim 1, wherein the flange extends laterally from an upper edge of the one or two straight side walls.

15. The set of nesting cups of claim 1, wherein the upper edge of the curved side wall defines a constant radius.

16. The set of nesting cups of claim 1, wherein the flange extends laterally from the rim and is marked to indicate a fraction that corresponds to a percentage of the circle.

17. The set of nesting cups of claim 13, wherein the circular bowl of the auxiliary cup defines a cavity having a volume of 8 liquid ounces.

18. A set of nesting measuring cups, comprising:
a first cup having a first rim defining a first opening into a first cavity defining a first volume, the first cavity bounded by a bottom surface and by a first side wall having a first curved portion and a straight portion, the first opening defined by an upper edge of the straight portion and an upper edge of the curved portion, the upper edge of the first curved portion defining a constant radius, the rim also forming a first flange that extends laterally from the upper edge of the straight portion, the first flange and the upper edge of the first curved portion of the first rim together forming a circular perimeter of the first cup;

a second cup having a second rim defining a second opening into a second cavity defining a second volume smaller than the first volume, the second cavity bounded by a bottom surface of the second cup and by a second side wall having a second curved portion and two straight portions, the second opening defined by upper edges of the two straight portions and an upper edge of the second curved portion, the upper edge of the second curved portion defining a constant radius, the rim also forming a second flange that extends laterally from the upper edges of the two straight portions, the second flange and the upper edge of the second curved portion of the second rim together forming a circular perimeter of the second cup, wherein the two straight portions together define an included angle of less than 180 degrees, and wherein the second cup is sized to nest within the first cup with the second flange lying against the first flange; and a third cup having a third rim defining a third opening into a third cavity defining a third volume smaller than the second volume, the third cavity bounded by a bottom surface of the third cup and by a third side wall having a third curved portion and two straight portions, the third opening defined by upper edges of the two straight portions of the third side wall and an upper edge of the third curved portion, the upper edge of the third curved portion defining a constant radius, the rim also forming a third flange that extends laterally from the upper edges of the two straight portions of the third side wall, the third flange and the upper edge of the third curved portion of the third rim together forming a circular perimeter of the third cup, wherein the two straight portions of the third side wall together define an included angle of less than 180 degrees, and wherein the third cup is sized to nest within the second cup with the third flange lying against the second flange, wherein the first, second, and third cups are configured to form a single stack of nested cups, with included angles decreasing from bottom to top of the stack.

19. The set of nesting cups of claim 18, wherein the two straight portions of the second side wall and the two straight portions of the third side wall, each extend at an angle, with respect to a line perpendicular to the second rim and the third rim, respectively, of less than 180 degrees.

* * * * *